(12) United States Patent
Sly et al.

(10) Patent No.: US 11,486,891 B2
(45) Date of Patent: Nov. 1, 2022

(54) AIR DATA SYSTEMS

(71) Applicant: Rosemount Aerospace Inc., Burnsville, MN (US)

(72) Inventors: Jaime Sly, Savage, MN (US); Mark Sherwood Miller, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 628 days.

(21) Appl. No.: 16/523,254

(22) Filed: Jul. 26, 2019

(65) Prior Publication Data
US 2021/0025916 A1 Jan. 28, 2021

(51) Int. Cl.
*G01P 5/24* (2006.01)
*G01P 5/26* (2006.01)

(52) U.S. Cl.
CPC .............. *G01P 5/245* (2013.01); *G01P 5/241* (2013.01); *G01P 5/26* (2013.01)

(58) Field of Classification Search
CPC .. G01P 5/245; G01P 5/241; G01P 5/26; G01P 13/025; G01S 7/521; G01S 15/003; G01S 17/58; G01S 17/003
See application file for complete search history.

(56) References Cited

U.S. PATENT DOCUMENTS

| 8,434,358 | B2 | 5/2013 | Asahara et al. | |
|---|---|---|---|---|
| 8,908,160 | B2 | 12/2014 | Dakin et al. | |
| 8,915,709 | B2 | 12/2014 | Westergaard | |
| 10,101,443 | B1 | 10/2018 | LeGrand, III et al. | |
| 10,908,277 | B1* | 2/2021 | Roggendorf | G01S 13/91 |
| 11,169,173 | B2* | 11/2021 | Sly | G01S 15/86 |
| 2004/0027570 | A1* | 2/2004 | Caldwell | G01S 17/95 356/28 |
| 2005/0131591 | A1* | 6/2005 | Drutowski | G01P 13/025 701/5 |
| 2010/0152933 | A1 | 6/2010 | Smoot et al. | |
| 2012/0173191 | A1* | 7/2012 | Moeller | G01P 5/22 73/488 |
| 2013/0094012 | A1 | 4/2013 | Peuser et al. | |
| 2013/0162974 | A1* | 6/2013 | Dakin | G01S 7/4818 356/28 |
| 2013/0314694 | A1* | 11/2013 | Tchoryk, Jr. | G01S 17/58 356/28.5 |
| 2018/0210441 | A1 | 7/2018 | Lin et al. | |

FOREIGN PATENT DOCUMENTS

JP        H09249198 A    9/1997

OTHER PUBLICATIONS

Extended European Search Report dated Jul. 3, 2020, issued during the prosecution of European Patent Application No. EP 19215549.7.

\* cited by examiner

*Primary Examiner* — Francis C Gray
(74) *Attorney, Agent, or Firm* — Locke Lord LLP; Daniel J. Fiorello; Gabrielle Gelozin

(57) ABSTRACT

An air data sensor can include an acoustic transmitter configured to output an acoustic signal into an airflow and a plurality of acoustic transducers configured to receive the acoustic signal output by the acoustic transducer. The air data sensor can also include a light source configured to output a light beam into the airflow, and a light receiver configured to receive scattered light from the light beam. The light source and the light receiver can be bistatic such that a measurement zone is formed away from the air data sensor.

19 Claims, 4 Drawing Sheets

AIR DATA SYSTEMS

FIELD

This disclosure relates to aircraft air data systems, and more particularly to air data systems utilizing acoustic sensing.

BACKGROUND

In order to create a full air data channel with an acoustic (e.g., ultrasonic) air data sensor, both sideslip (e.g., also referred to as beta) compensation and/or the 3rd velocity vector and measure of static pressure is required. Known architecture methods for doing this include placing another acoustic air data sensor in the angle of sideslip (AOS) plane of the aircraft and coupling the system with a pneumatic static port. This requires additional sensors and install locations.

An acoustic air data sensor can provide a dissimilar source of True Airspeed (TAS) and/or Mach, Static Air Temperature (SAT) (by measuring the Speed of Sound), and a 2-dimensional flow direction which can be used to calculate angle of attack AOA or AOS depending on installation orientation. However, for calibration/performance purposes, and to provide a complete air data channel, a measure of AOS or the 3rd velocity vector and a measure of static pressure is required in order to compute a Pressure Altitude. Existing systems may use of a pneumatic static port which can be susceptible to certain errors and failure modes associated therewith.

Such conventional methods and systems have generally been considered satisfactory for their intended purpose. However, there is still a need in the art for improved air data systems. The present disclosure provides a solution for this need.

SUMMARY

An air data sensor can include an acoustic transmitter configured to output an acoustic signal into an airflow and a plurality of acoustic transducers configured to receive the acoustic signal output by the acoustic transducer. The air data sensor can also include a light source configured to output a light beam into the airflow, and a light receiver configured to receive scattered light from the light beam. The light source and the light receiver can be bistatic such that a measurement zone is formed away from the air data sensor.

In certain embodiments, the air data sensor can include a plate body and one or more lenses mounted to the plate body and disposed in optical communication with each the light source and the light receiver. The plurality of acoustic transducers can be disposed on an outer surface of the plate body. The acoustic transmitter, the light source, and the light receiver can be disposed at least partially within the aperture.

The light source and the light receiver can be disposed on opposite sides of the acoustic transmitter and angled inward toward the acoustic transmitter. The acoustic transmitter can be aligned centered to the plate body, for example. In certain embodiments, the light source and the light receiver can be disposed equidistant from the acoustic transmitter such that the measurement zone is centered above the acoustic transmitter.

The light source and the light receiver can be angled such that the measurement zone is about 6 inches to about 12 inches away from the plate body. In certain embodiments, the light source and the light receiver can be angled such that the measurement zone is outside of a boundary layer thickness of airflow.

The light source can be a laser and the acoustic transmitter can be an ultrasonic transmitter. Any other suitable light source and/or acoustic transmitter is contemplated herein.

In certain embodiments, the air data sensor can include an air data module operatively connected to the light receiver, the light source, and the acoustic transducers and configured to receive light data from the light receiver and acoustic data from the plurality of acoustic transducers. The air data module can be configured to determine at least one of a local static pressure measurement, a static air temperature, and/or an orthogonal velocity component to provide at least one of a pressure altitude, a sideslip compensation, and/or one or more correction inputs to one or more acoustic data measurements. In certain embodiments, the air data module can be configured to determine a forward airspeed and angle of attack (AOA) using signals from the acoustic transducers, and to determine an orthogonal airspeed to measure angle of sideslip (AOS) using signals from the light receiver. Any other suitable determination by the air data computer is contemplated herein.

In accordance with at least one aspect of this disclosure, a method can include using an acoustic (e.g., ultrasonic) air data sensor assembly to determine one or more first air data parameters of an airflow and using a bistatic sensing arrangement to determine one or more second air data parameters of an airflow. The one or more first air data parameters can include true airspeed (TAS), Mach number, static air temperature (SAT), or a two dimensional flow vector. The one or more second air data parameters can include local pressure or a measure of airspeed orthogonal to the two dimensional flow vector.

Using the bistatic sensing arrangement can include measuring at a measurement zone outside of a boundary layer of the airflow. Using the bistatic sensing arrangement can include measuring at a measurement zone between about 6 inches to about 12 inches away from the ultrasonic air data system.

Using the bistatic sensing arrangement can include using a plurality of bistatic laser-receiver pairs having different measurements zones. In certain embodiments, the different measurement zones do not overlap. In certain embodiments, using the bistatic laser includes using Rayleigh scattering to determine the one or more second air data parameters. Any other suitable type of measurement scheme is contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
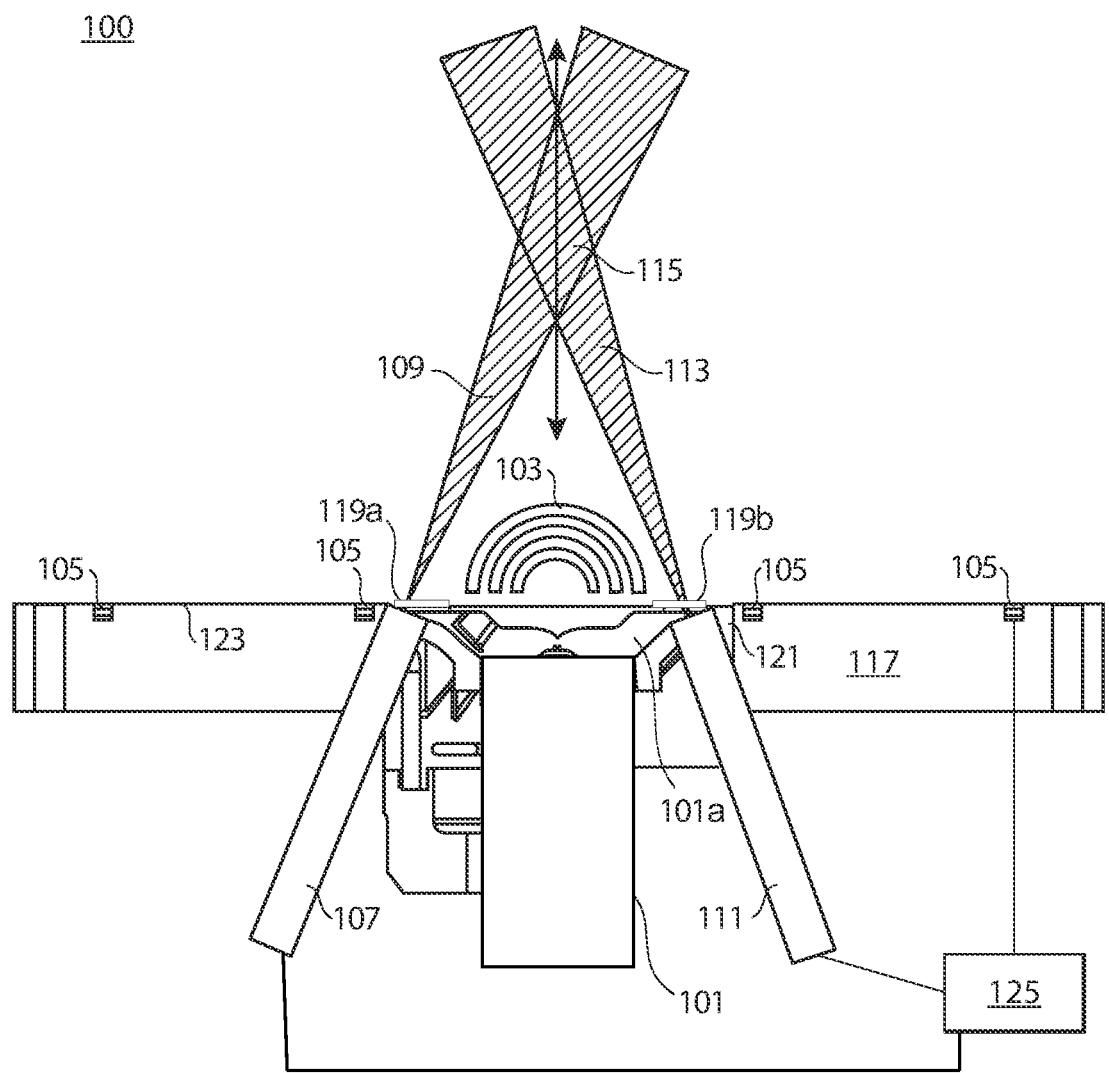
FIG. 1 is a cross-sectional schematic view of an embodiment of an air data sensor in accordance with this disclosure.
Figure 1A:
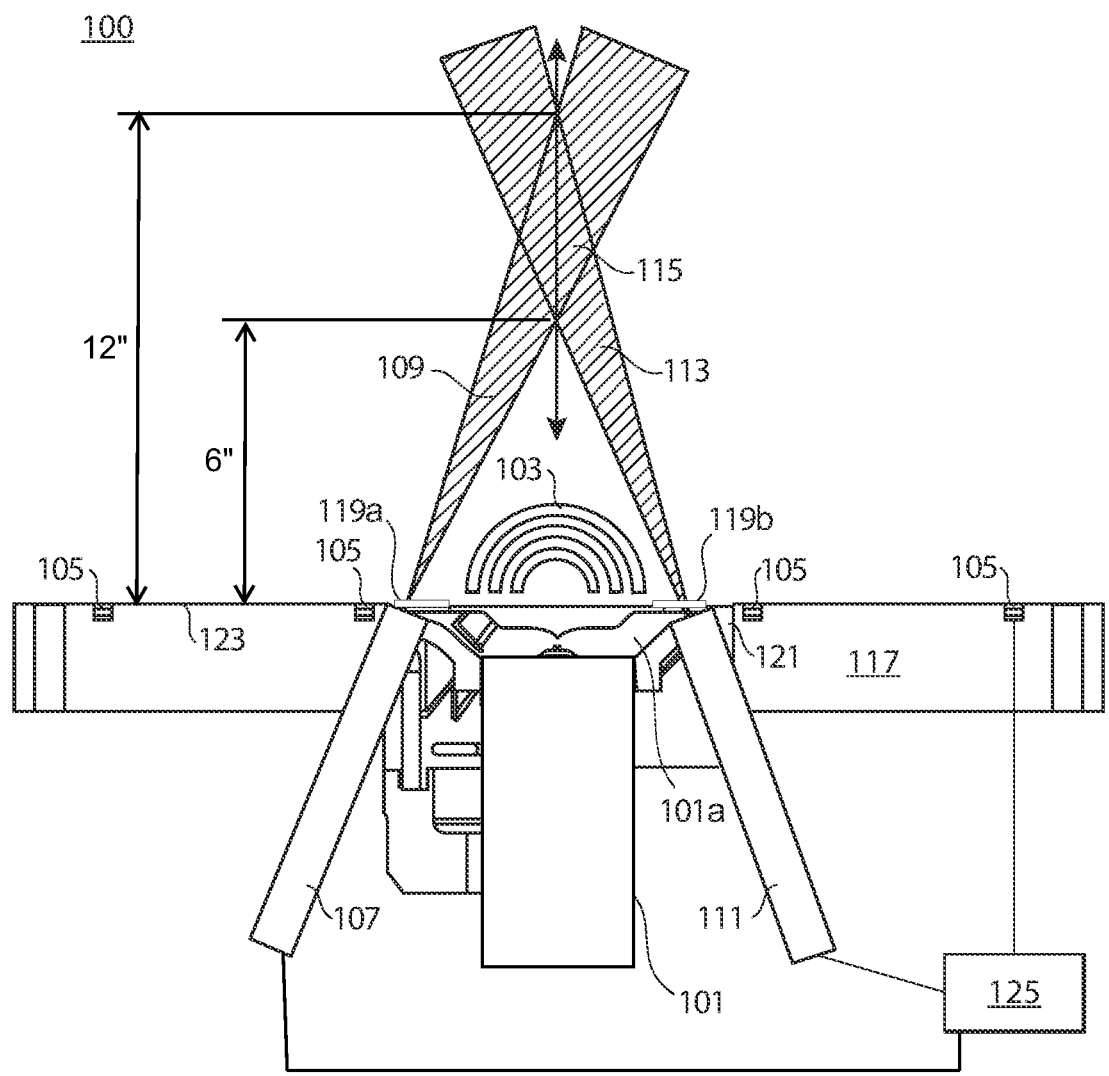
FIG. 1A is a cross-sectional schematic view of an embodiment of an air data sensor in accordance with this disclosure, shown having a light source and a light receiver angled such that a measurement zone is about 6 inches to about 12 inches away from the plate body.
Figure 2:
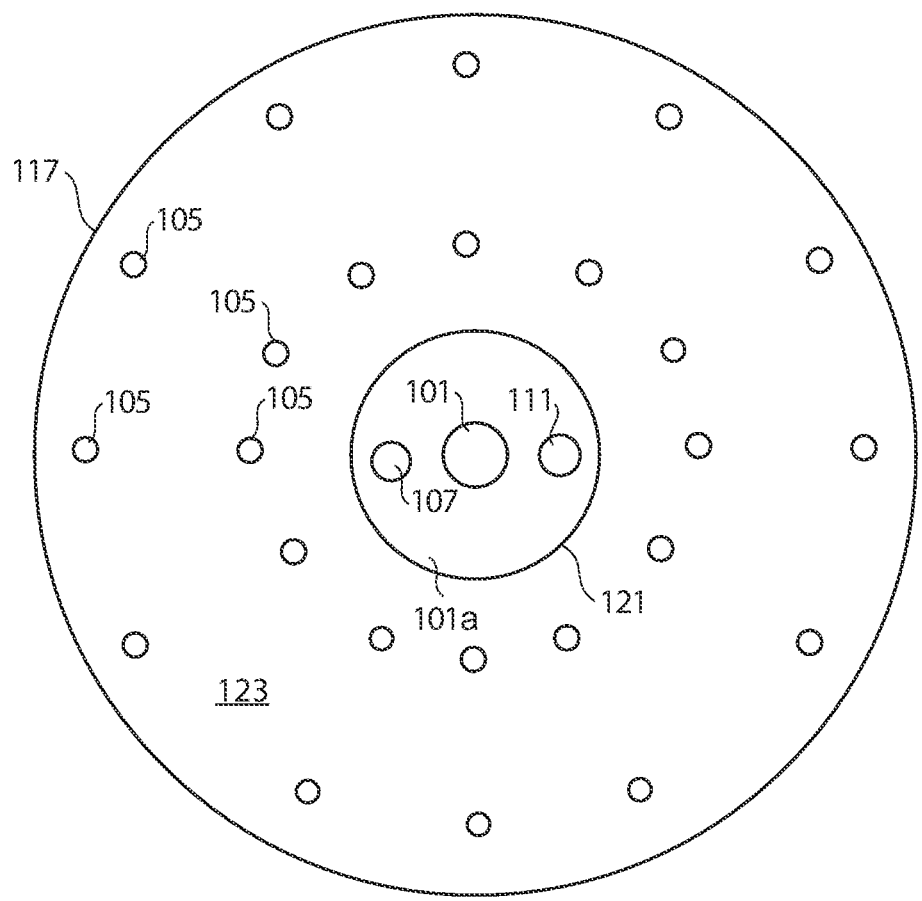
FIG. 2 is a plan view of the embodiment of FIG. 1.
Figure 3:
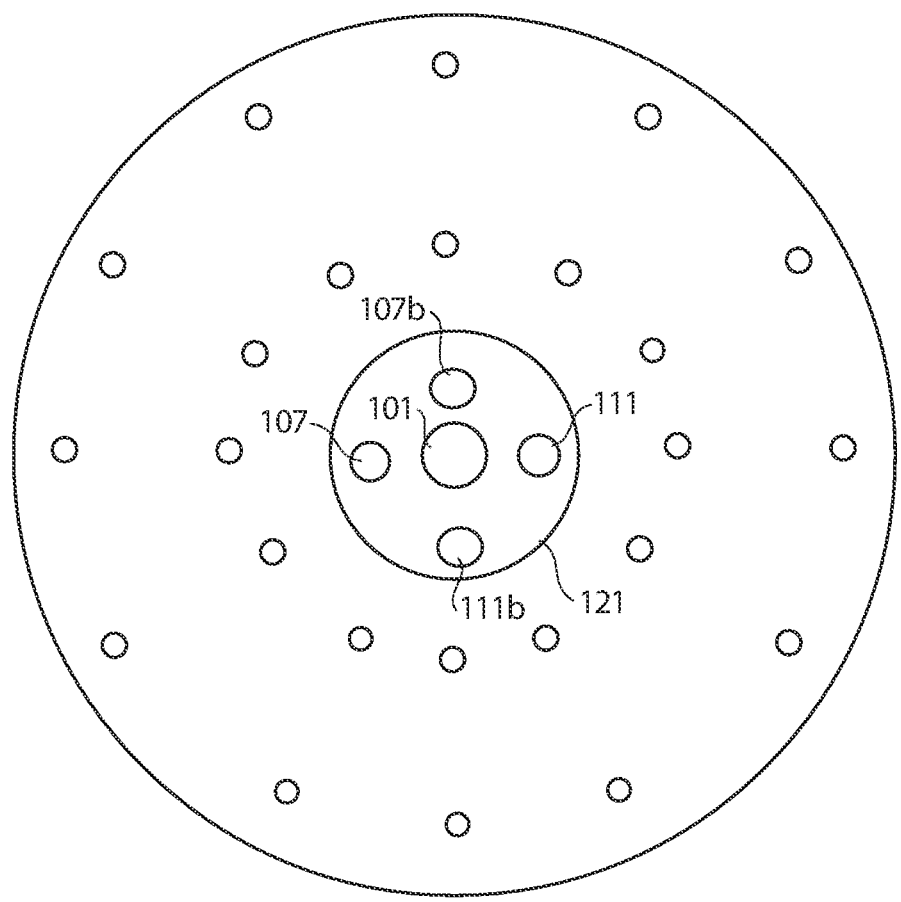
FIG. 3 is a plan view of the embodiment of FIG. 1, shown having a plurality of bistatic lasers.

Reference will now be made to the drawings wherein like reference numerals identify similar structural features or aspects of the subject disclosure. For purposes of explanation and illustration, and not limitation, an illustrative view of an embodiment of an air data sensor in accordance with the disclosure is shown in FIG. 1 and is designated generally by reference character 100. Other embodiments and/or aspects of this disclosure are shown in FIGS. 1A, 2, and 3. Certain embodiments described herein can be used to provide more air data parameters than an acoustic only system, as well as more accurate, compensated parameters.

Referring to FIG. 1, an air data sensor 100 can include an acoustic transmitter 101 configured to output an acoustic signal 103 into an airflow and a plurality of acoustic transducers 105 configured to receive the acoustic signal 103 output by the acoustic transducer 105. Any suitable acoustic transducer 105 (e.g., a MEMS sensor) is contemplated herein.

In certain embodiments, the air data sensor 100 can also include a light source 107 (e.g., a laser) configured to output a light beam 109 into the airflow. In certain embodiments, the air data sensor 100 includes a light receiver 111 configured to receive scattered light from the light beam 109 (e.g., within a field of view 113).

The light source 107 and the light receiver 111 can be bistatic such that a measurement zone 115 is formed away from the air data sensor. As appreciated by those having ordinary skill in the art, the term "bistatic" means that a light source 105 and a receiver 111 are separated (e.g., as in a radar system comprising a transmitter and receiver that are separated by a distance comparable to the expected target distance). The measurement zone 115 is the area/volume of intersecting portions of the field of projection of the light source 107 and the field of view of the receiver 111, for example.

A bistatic arrangement can reliably provide an orthogonal airspeed reading and can allow distance away from the plate that reading is taken to be chosen. However, it is contemplated that a uniaxial system (e.g., having a single telescope for source 107 and receiver 111) can be used. A time of flight arrangement can be used to choose the measurement volume (away from the sensor body), and the measurement direction would be in the axis of the singular telescope. Such an embodiment may require that the telescope be placed in a location that allows it to be pointed orthogonally out of the plate body. A bistatic arrangement can be beneficial, however, because of the natural shape of certain acoustic horns associated with certain embodiments of the transmitter 101, and the angels of the edge of that horn which can allow a bistatic laser sensing assembly to define a measurement volume a short distance away from the plate body and/or the horn while still providing truly orthogonal airspeed information.

Referring additionally to FIG. 2, in certain embodiments, the air data sensor 100 can include a plate body 117 (e.g., circular or any other shape). In certain embodiments, the air data sensor 100 can include one or more lenses 119a, b (e.g., at least partially transparent to the light beam 109) mounted to the plate body 117 and disposed in optical communication with each the light source 107 and the light receiver 111. The one or more lenses 119a, 119b can be disposed over each of the light source 107 and the light receiver 111 (e.g., over a portion of aperture 121 of the plate body 117). The aperture 121 can be formed centrally in the plate body 117 as shown, or in any other suitable position.

Each lens 119a, b and/or light source 107 and/or receiver 111 can be mounted onto and/or through and/or form part of a horn 101a of the acoustic transmitter 101. Any other suitable arrangement is contemplated herein.

As shown, the plurality of acoustic transducers 105 can be disposed on an outer surface 123 of the plate body 117. The acoustic transducer 105 can be disposed in any suitable pattern (e.g., circumferentially around the plate body 117 as shown or in any other suitable manner appreciated by those having ordinary skill in the art in view of this disclosure).

As shown, the acoustic transmitter 101, the light source 107, and the light receiver 111 can be disposed at least partially within the aperture 121. In certain embodiments, the light source 107 and the light receiver 111 can be disposed in one or more separate apertures defined in the plate body 117, for example (e.g., individual channels capped with each respective lens 119a, 119b, respectively). Any other suitable position is contemplated herein.

The light source 107 and the light receiver 111 can be disposed on opposite sides of the acoustic transmitter 101 and angled inward toward the acoustic transmitter 101, e.g., as shown in FIG. 1. The angle can be optimized based on an acoustic horn geometry (e.g., the wave guide for the acoustic transmitter) and the geometry of the laser configuration in terms of setting the measurement zone position. The acoustic transmitter 101 can be aligned centered to the plate body 117, for example. In certain embodiments, the light source 107 and the light receiver 111 can be disposed equidistant (e.g., and angled equally) from the acoustic transmitter 101 such that the measurement zone 115 is centered (e.g., symmetrically) above the acoustic transmitter 101.

As shown additionally in FIG. 1A, the light source 107 and the light receiver 111 can be angled such that the measurement zone 115 is about 6 inches to about 12 inches away from the plate body 117. In certain embodiments, the light source 107 and the light receiver 111 can be angled such that the measurement zone 115 is outside of a boundary layer thickness of airflow.

In certain embodiments, the light source 107 and the light receiver 111 can be angled between about 10 to about 20 degree. In certain embodiments, the light source 107 and the light receiver 111 can be angled relative to each respective lens 119a, 119b, for example. Any suitable angle that allows light to travel through each respective lens 119a, 119b is contemplated herein. In certain embodiments, the lens 119a and/or 119b can form part of the light source 107 and/or light receiver 111.

Referring additionally to FIG. 3, an air data sensor 100 can include one or more additional light sources 107b and/or light receivers 111b. As shown, the one or more additional light sources 107b and receivers 111b can be bistatic. It is contemplated that the additional bistatic pair 107b, 111b can be redundant to the bistatic pair 107, 111 such that the measurement zone 115 is the same (e.g., such that light sources 107, 107b operate intermittently).

In certain embodiments, the additional bistatic pair 107b, 111b can have a different measurement zone than measurement zone 115 (e.g., with no overlap or some overlap) of the bistatic pair 107, 111. In certain embodiments, the additional measurement zone can be entirely separate from the measurement zone 115 such that a different area (e.g., within the boundary layer, further away from the plate body 117 along centerline, off center, and/or any other suitable area) can be measured. In certain embodiments, the data from different receivers can be averaged (e.g., by air data module 125 described below).

In certain embodiments, the one or more light sources (e.g., 107, 107b) can be a laser and the acoustic transmitter 101 can be an ultrasonic transmitter, for example. Any other suitable light source and/or acoustic transmitter are contemplated herein. The acoustic transmitter 101 can be any suitable size (e.g, about 2 to about 4 inches in diameter) and configured to output any suitable amplitude (e.g., sufficient to clear ice on the lens 119). The light receiver 111 can be or include any suitable collection optics, for example (e.g., a camera).

In certain embodiments, the air data sensor 100 can include an air data module 125 operatively connected to the light receiver 111, the light source 107, and the acoustic transducers 105. The air data module 125 can be configured to receive light data from the light receiver 111 and acoustic data from the plurality of acoustic transducers 105. The air data module 125 can be configured to determine at least one of a local static pressure measurement, a static air temperature (SAT), and/or an orthogonal velocity component (orthogonal to the plane defined by the surface 123 of the plate body 117). The air data module 125 can be configured to provide at least one of a pressure altitude, a sideslip compensation (e.g., also referred to as beta-compensation), and/or one or more correction inputs to one or more acoustic data measurements. In certain embodiments, the air data module 125 can be configured to determine a forward airspeed and angle of attack (AOA) using signals from the acoustic transducers 105, and to determine an orthogonal airspeed to measure angle of sideslip (AOS) using signals from the light receiver 111. Any other suitable determination by the air data module 125 is contemplated herein. The air data module 125 can include any suitable hardware and/or software module(s) as appreciated by those having ordinary skill in the art.

In accordance with at least one aspect of this disclosure, a method can include using an acoustic (e.g., ultrasonic) air data sensor assembly to determine one or more first air data parameters of an airflow and using a bistatic sensing arrangement (e.g., a bistatic laser sensing assembly) to determine one or more second air data parameters of an airflow. The one or more first air data parameters can include true airspeed (TAS), Mach number, static air temperature (SAT), and a two dimensional flow vector. The one or more second air data parameters can include local static pressure and a measure of airspeed orthogonal to the two dimensional flow vector.

Use of the one or more embodiments of a sensing arrangement can include measuring at a measurement zone outside of a boundary layer of the airflow. Use of the one or more embodiments of the sensing arrangement can include measuring at a measurement zone between about 6 inches to about 12 inches away from the acoustic air data system. Any other suitable distances and/or locations are contemplated herein.

Use of the sensing arrangement can include using a plurality of laser/receiver pairs having different measurements zones. In certain embodiments, the different measurement zones do not overlap. In certain embodiments, use of the laser sensing assembly includes using Rayleigh scattering to determine the one or more second air data parameters. Any other suitable type of measurement scheme is contemplated herein.

As disclosed above, embodiments can include a circular or elliptical plate with an array of microphones and an acoustic (e.g., ultrasonic) transmitter. The transmitter can include a horn feature that directs the acoustic energy in a radial direction towards the microphones, for example. Embodiments can optimize the radial space and angles for a bistatic laser system that provides an overlap measurement area in the range at a desired distance (e.g., about 6 to about 12 inches) from the face of the plate.

Embodiments can include one or more pairs of laser transmitters/receivers depending on the level of redundancy or performance desired. In embodiments, the addition of a the laser sensing assembly can provide both a local static pressure measurement that can be used to measure pressure altitude and/or as a calibration input, a second source of static air temperature (SAT) that can be used to improve the speed of sound measurement from the acoustic system as well as further correct the air data calculations that are based on the ultrasonic time-of-flight (TOF) signals, and can provide a measurement of the orthogonal velocity component which can provide beta-compensation and additional correction inputs to the ultrasonic-based velocity measurements.

Embodiments can allow for the high amplitude acoustic (e.g., ultrasonic) source to actively clean and/or deice the optical windows for the laser and collection optics which can reduce or eliminate the need for a heating system to maintain operability of the optics which reduces weight. Embodiments can focus the laser measurement close to the boundary layer such that increased signal-to-noise ratio can be obtained. Embodiments of a light/receiver system can augment the ultrasonic system to obtain all desired sensor data (e.g., 3 dimensional velocity and pressure readings that may not be obtainable using only the acoustic measurement systems). Embodiments can allow sideslip compensation and pressure altitude deduction from a single sensor.

Embodiments can include multiple lasers and receivers for redundancy and/or averaging of the measurements, which can be in different positions and/or have different focal points (e.g., one at 6 inches, the other at 12). In certain embodiments, multiple lasers can run simultaneously, e.g., if the receiver field of view of both do not overlap with the laser field of projection of the other. In certain embodiments, multiple bistatic laser sensing assemblies can be configured to determine different velocity vectors, for example.

Certain embodiments can use a molecular based scattering of the laser light to measure a volume of air directly above the ultrasonic transmitter which can provide a local, non-pneumatic static pressure for calibration purposes and pressure altitude, a second source of static air temperature to augment the ultrasonic based speed of sound measurement, and a measurement of the orthogonal velocity component for beta compensation and angle of sideslip (AOS) calculation. In embodiments, the addition of the laser in a strategic location can take advantage of the source horn design and allow for a single sensor unit to provide a fully dissimilar channel of air data parameters and improve on the performance of the ultrasonic sensing.

Embodiments can include a single unit that can provide a complete single set of air data parameters. The light measurements can be used to augment the acoustic measurements in order to increase performance, for example. For example, in at least certain existing systems, acoustic systems cannot provide a static pressure measurement and a 3rd dimension of velocity. Embodiments of a light system can provide these parameters. Static pressure is required for the computation of Calibrated Airspeed (CAS), which can be desired by pilots for flying by CAS (not TAS), as well as for computing pressure altitude. Also, the light measurement system can be used to calibrate Mach, AOA, and SAT computed based on acoustic data.

As will be appreciated by those skilled in the art, aspects of the present disclosure may be embodied as a system, method, or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An air data sensor, comprising:
   an acoustic transmitter configured to output an acoustic signal into an airflow;
   a plurality of acoustic transducers configured to receive the acoustic signal output by the acoustic transmitter;
   a light source configured to output a light beam into the airflow;
   a light receiver configured to receive scattered light from the light beam, wherein the light source and the light receiver are bistatic such that a measurement zone is formed away from the air data sensor;
   a plate body; and
   one or more lenses mounted to the plate body and disposed in optical communication with each the light source and the light receiver.

2. The air data sensor of claim 1, wherein the plurality of acoustic transducers are disposed on an outer surface of the plate body.

3. The air data sensor of claim 1, wherein the acoustic transmitter, the light source, and the light receiver are disposed at least partially within the aperture.

4. The air data sensor of claim 3, wherein the light source and the light receiver are disposed on opposite sides of the acoustic transmitter and angled inward toward the acoustic transmitter.

5. The air data sensor of claim 4, wherein the acoustic transmitter is aligned centered to the plate body, wherein the light source and the light receiver are disposed equidistant from the acoustic transmitter such that the measurement zone is centered above the plate body.

6. The air data sensor of claim 1, wherein the light source and the light receiver are angled such that the measurement zone is about 6 inches to about 12 inches away from the plate body.

7. The air data sensor of claim 1, wherein the light source and the light receiver are angled such that the measurement zone is outside of a boundary layer thickness of airflow.

8. The air data sensor of claim 1, wherein the light source is a laser and the acoustic transmitter is an ultrasonic transmitter.

9. The air data sensor of claim 1, further comprising an air data module operatively connected to the light receiver, the light source, and the acoustic transducers and configured to receive light data from the light receiver and acoustic data from the plurality of acoustic transducers, wherein the air data module is configured to determine at least one of a local static pressure measurement, a static air temperature, and/or an orthogonal velocity component to provide at least one of a pressure altitude, a sideslip compensation, and/or one or more correction inputs to one or more acoustic data measurements.

10. The air data sensor of claim 9, wherein the air data module is configured to determine a forward airspeed and angle of attack (AOA) using signals from the acoustic transducers, and to determine an orthogonal airspeed to measure angle of sideslip (AOS) using signals from the light receiver.

11. A method, comprising:
    using an ultrasonic air data sensor assembly to determine one or more first air data parameters of an airflow; and
    using a bistatic sensing arrangement to determine one or more second air data parameters of an airflow, wherein using the bistatic sensing arrangement includes measuring at a measurement zone between about 6 inches to about 12 inches away from the ultrasonic air data system.

12. The method of claim 11, wherein the one or more first air data parameters include true airspeed (TAS), Mach number, static air temperature (SAT), or a two dimensional flow vector.

13. The method of claim 12, wherein the one or more second air data parameters include local pressure or a measure of orthogonal velocity orthogonal to the two dimensional flow vector.

14. The method of claim 11, wherein using the bistatic sensing arrangement includes measuring at a measurement zone outside of a boundary layer of the airflow.

15. The method of claim 11, further comprising using the bistatic sensing arrangement includes using a plurality of bistatic lasers having different measurements zones.

16. The method of claim 15, wherein the different measurement zones do not overlap.

17. The method of claim 11, wherein using the bistatic sensing arrangement includes using Rayleigh scattering to determine the one or more second air data parameters.

18. An air data sensor, comprising:
    an acoustic transmitter configured to output an acoustic signal into an airflow;
    a plurality of acoustic transducers configured to receive the acoustic signal output by the acoustic transmitter;
    a light source configured to output a light beam into the airflow;
    a light receiver configured to receive scattered light from the light beam; and
    an air data module operatively connected to the light receiver, the light source, and the acoustic transducers and configured to receive light data from the light receiver and acoustic data from the plurality of acoustic transducers, wherein the air data module is configured to determine one or more correction inputs to one or more acoustic data measurements.

19. An air data sensor, comprising:

an acoustic transmitter configured to output an acoustic signal into an airflow;

a plurality of acoustic transducers configured to receive the acoustic signal output by the acoustic transmitter;

a light source configured to output a light beam into the airflow;

a light receiver configured to receive scattered light from the light beam; and an air data module operatively connected to the light receiver, the light source, and the acoustic transducers and configured to receive light data from the light receiver and acoustic data from the plurality of acoustic transducers, wherein the air data module is configured to determine a forward airspeed and angle of attack (AOA) using signals from the acoustic transducers, and to determine an orthogonal airspeed to measure angle of sideslip (AOS) using signals from the light receiver.

\* \* \* \* \*